(12) United States Patent
Hazell

(10) Patent No.: US 7,912,462 B2
(45) Date of Patent: *Mar. 22, 2011

(54) METHOD FOR CONDUCTING DIGITAL INTERFACE AND BASEBAND CIRCUITRY TESTS USING DIGITAL LOOPBACK

(75) Inventor: Barry Steven Hazell, Ottawa (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,108

(22) Filed: Jul. 30, 2009

(65) Prior Publication Data

US 2009/0286530 A1 Nov. 19, 2009

Related U.S. Application Data

(63) Continuation of application No. 10/934,426, filed on Sep. 7, 2004, now Pat. No. 7,587,202.

(51) Int. Cl.
H04W 24/00 (2009.01)
(52) U.S. Cl. .................. 455/423; 455/425; 455/67.11
(58) Field of Classification Search .............. 455/423, 455/425, 67.11
See application file for complete search history.

(56) References Cited

U.S. PATENT DOCUMENTS

| | | | |
|---|---|---|---|
| 4,059,729 A | 11/1977 | Eddy et al. | |
| 4,554,510 A | 11/1985 | Furumoto | |
| 4,926,425 A | 5/1990 | Hedtke et al. | |
| 5,274,668 A | 12/1993 | Marschall | |
| 5,553,059 A * | 9/1996 | Emerson et al. | 370/248 |
| 5,787,114 A | 7/1998 | Ramamurthy et al. | |
| 5,802,073 A | 9/1998 | Platt | |
| 6,052,409 A | 4/2000 | Quirk et al. | |
| 6,088,588 A | 7/2000 | Osborne | |
| 6,748,050 B2 * | 6/2004 | Lazarus et al. | 379/3 |
| 6,973,600 B2 * | 12/2005 | Lau et al. | 714/704 |
| 7,206,982 B1 | 4/2007 | Patel et al. | |
| 7,218,861 B2 | 5/2007 | Totsuka et al. | |
| 7,548,625 B2 | 6/2009 | Dorfman et al. | |
| 2002/0146999 A1 | 10/2002 | Witte | |
| 2003/0149921 A1 * | 8/2003 | Lau et al. | 714/704 |
| 2004/0077344 A1 | 4/2004 | Bernasconi et al. | |
| 2004/0105613 A1 | 6/2004 | Chown | |
| 2004/0203467 A1 | 10/2004 | Liu et al. | |
| 2006/0094365 A1 | 5/2006 | Inogai et al. | |

FOREIGN PATENT DOCUMENTS

EP 1441491 7/2004

OTHER PUBLICATIONS

Canadian Office Action, CA serial No. 2516204 mailed on Apr. 17, 2009.

* cited by examiner

*Primary Examiner* — Edward Urban
*Assistant Examiner* — Fayyaz Alam
(74) *Attorney, Agent, or Firm* — Moffat & Co.

(57) ABSTRACT

In a mobile device having a primary baseband circuit and a secondary baseband circuit and an interface between the primary baseband circuit and a secondary baseband circuit, a method for testing the interface and primary and secondary baseband circuits comprising the steps of: setting the secondary baseband circuit into a loopback mode; sending a first signal from the primary baseband circuit to the secondary baseband circuit; receiving at the primary baseband circuit a second signal, the second symbol being the first signal looped back from the secondary baseband circuit; and comparing the second signal with an expected result.

10 Claims, 5 Drawing Sheets

METHOD FOR CONDUCTING DIGITAL INTERFACE AND BASEBAND CIRCUITRY TESTS USING DIGITAL LOOPBACK

RELATED APPLICATIONS

The present application is a continuation of U.S. patent application Ser. No. 10/934,426, filed Sep. 7, 2004, the contents of which are incorporated herein by reference.

FIELD OF THE APPLICATION

The present application deals with a method for testing an interface and baseband circuitry and, in particular, to testing a digital interface using a test tone, which can be comprised of multiple frequency tones or a single tone generated by one baseband chip while the other baseband chip interface is configured in a loopback mode.

BACKGROUND

Many modern mobile devices include two audio baseband chips. These are typically used for various communication means by the mobile device. In one example, such communication means could include a radio frequency communication means to communicate over a wireless network, such as a Mobitex™ mobile communication system, a DataTAC™ mobile communication system, GPRS network, UMTS network, EDGE network, or CDMA network. A secondary baseband circuit could be used for communications for short-range systems including a Bluetooth™ system.

One problem with present devices with two audio baseband chips is the inability to test the interface between the audio baseband chips. Generally, hardware needs to be added to a circuit board in order to facilitate the testing of these audio baseband chips. Further, expensive test equipment is required for this testing.

Further, to properly test the interface would require the enabling of the radio for both the audio baseband chips which requires the setting up of radio test equipment and acoustic test equipment for generating and analyzing audio test signals.

SUMMARY

The present method is used to verify two audio baseband circuits and the digital interface between the two audio baseband circuits without requiring any external test equipment. In a preferred embodiment, one baseband circuit is a mobile station digital baseband chip and the second baseband circuit is a Bluetooth™ baseband chip. The interface between the two audio baseband chips is a codec PCM interface, however, as will be appreciated by those skilled in the art, other digital chips and digital interfaces could be used with the present method and the example of a mobile station baseband circuit and a Bluetooth™ baseband chip with a PCM interface is, in no way, meant to limit the scope of the present method.

In one embodiment, the present method uses a Bluetooth™ protocol radio test command to configure the Bluetooth™ audio baseband circuit into a digital loopback mode. From the mobile station audio baseband circuit, a single tone or dual tone multiple frequency (DTMF) test signal is generated and transmitted internally to the Bluetooth™ audio baseband circuit over the codec PCM transmit interface. The Bluetooth™ audio baseband circuit will loop back the test signal to the mobile station audio baseband circuit over the codec PCM receive interface. The mobile station audio baseband circuit will detect the test signal and will use software to test a specific register and compare the data with the expected result. This will verify the interface and audio baseband circuits.

The present application therefore provides, in a mobile device having a first audio baseband circuit and a second audio baseband circuit and an interface between the first audio baseband circuit and a second audio baseband circuit, a method for internal verification of the interface and first and second audio baseband circuits comprising the steps of: setting the second audio baseband circuit into a loopback mode; sending a test signal from the first audio baseband circuit to the second audio baseband circuit via the interface; receiving at the first audio baseband circuit a second signal via the interface, the second symbol being the first signal looped back from said second audio baseband circuit; and comparing the second signal to the original test signal.

BRIEF DESCRIPTION OF THE DRAWINGS

The present method will be better understood with reference to the drawings in which.

DETAILED DESCRIPTION OF THE DRAWINGS

The present method is used for the internal verification of an interface between two audio baseband circuits. Since the interface can be verified internally, this reduces the need for external test equipment and reduces the external components needed on a circuit board for a mobile station.

Figure 1:
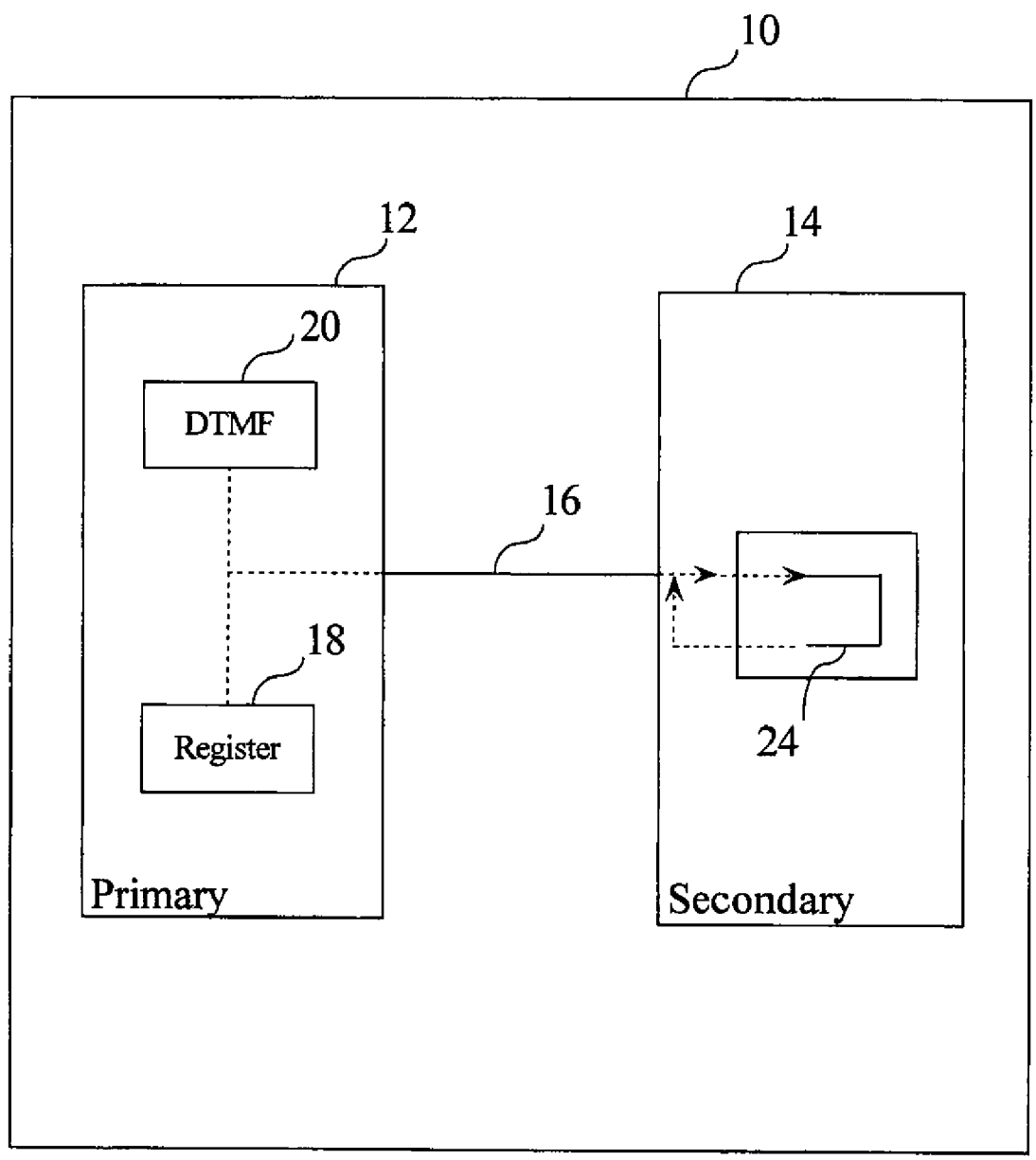
FIG. 1 is a block diagram of a mobile station with two digital baseband chips.

Reference is now made to the drawings. FIG. 1 shows a mobile station 10. Mobile station 10 according to the present method includes two digital baseband circuits which are labelled as primary baseband circuit 12 and secondary baseband circuit 14. In one embodiment, the primary baseband circuit is a combination of the radio frequency baseband chip and a digital audio baseband chip for the primary communication of a mobile station. Secondary baseband circuit 14 is preferably comprised of a secondary communication baseband circuit such as a Bluetooth™ baseband chip which includes both the radio frequency and digital audio baseband chip in one. Such chips are known in the art and are made, for example, by Qualcomm.

Mobile station 10 includes numerous other components besides primary baseband circuit 12 and secondary baseband circuit 14, and these are specified in more detail below with reference to FIG. 4.

Mobile station 10 includes an interface 16 between primary baseband circuit 12 and secondary baseband circuit 14. In one embodiment, interface 16 includes four lines which are comprised of a transmit line, a receive line, and two clock lines.

Primary baseband circuit 12 preferably includes a dual-tone multiple frequency (DTMF) module 20. A DTMF module 20 is used by primary baseband circuit 12 for touchtone dialing. It generates a combination of two tones where one tone is a low frequency and the other a high frequency. A DTMF module 20 exists in most primary baseband circuits 12.

Secondary baseband circuit 14 includes a digital interface module 24 which is generally used by secondary baseband circuit 14 to transmit a signal received over interface 16 to the outside world. In a preferred embodiment, digital interface module 24 is a pulse code modulation (PCM) module.

Digital interface module 24 allows the secondary baseband circuit 14 to be configured into a PCM loopback mode. Basically, this causes signals received at interface 16 to be looped back and sent to the originator. The signal sent to secondary baseband circuit 14 can be considered a first signal and received from secondary baseband circuit 14 can be considered a second signal.

Figure 2:
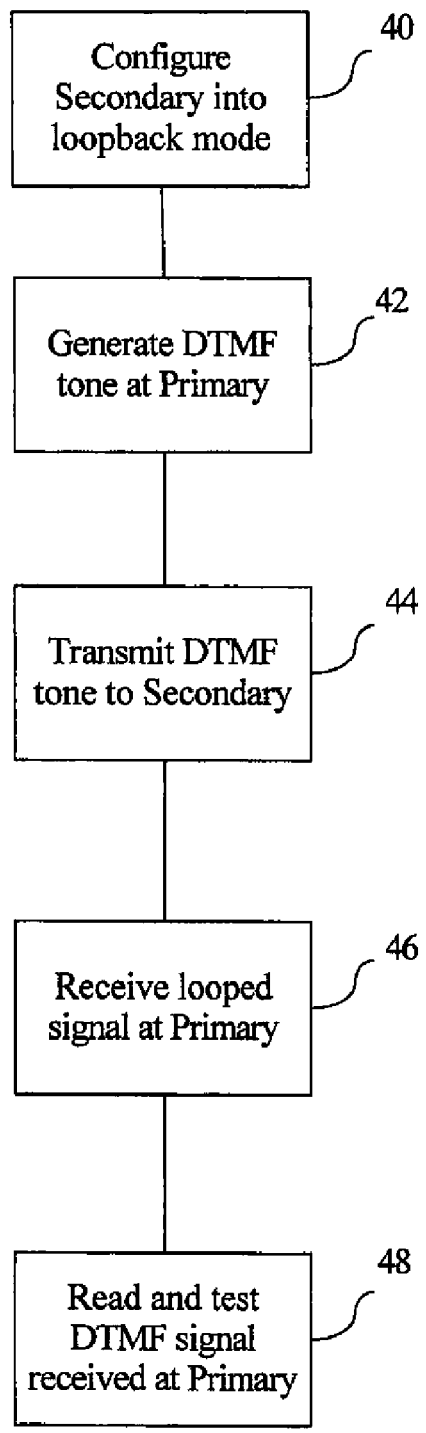
FIG. 2 is a flow chart of a method of testing the digital interface.

Reference is now made to FIG. 2.

A method of testing according to the present application is described. In step 40, secondary baseband circuit 14 is configured so that digital interface 24 is put into a loopback mode.

Next, in step 42, DTMF module 20 generates a tone that in step 44 is transmitted to the secondary baseband circuit 14. Once the signal is received at secondary baseband circuit, it is looped back through digital interface module 24 to primary baseband circuit 12 in step 46.

In step 48, the primary baseband circuit 12 receives the loopback signal, and detects the DTMF signal. These results are put into a register 18 and test software is then used to read register 18 and compare data within that register with the expected result. This comparison checks whether the signal level and frequency are at the expected values.

Accordingly, the present method allows for the testing of the interface between the primary and the secondary baseband circuits 12 and 14 respectively by generating a signal at the primary baseband circuit 12, sending it over interface 16 to secondary baseband circuit 14 where it is looped back through PCM loopback mode back to primary baseband circuit 12. At this point, it is tested to see whether it matches what the expected result should be.

Since the present method is completely internal within mobile station 10, external equipment is therefore not needed, saving time and expense. Further, space on the circuit board is saved by not requiring external components on the board for test purposes.

Figure 3:
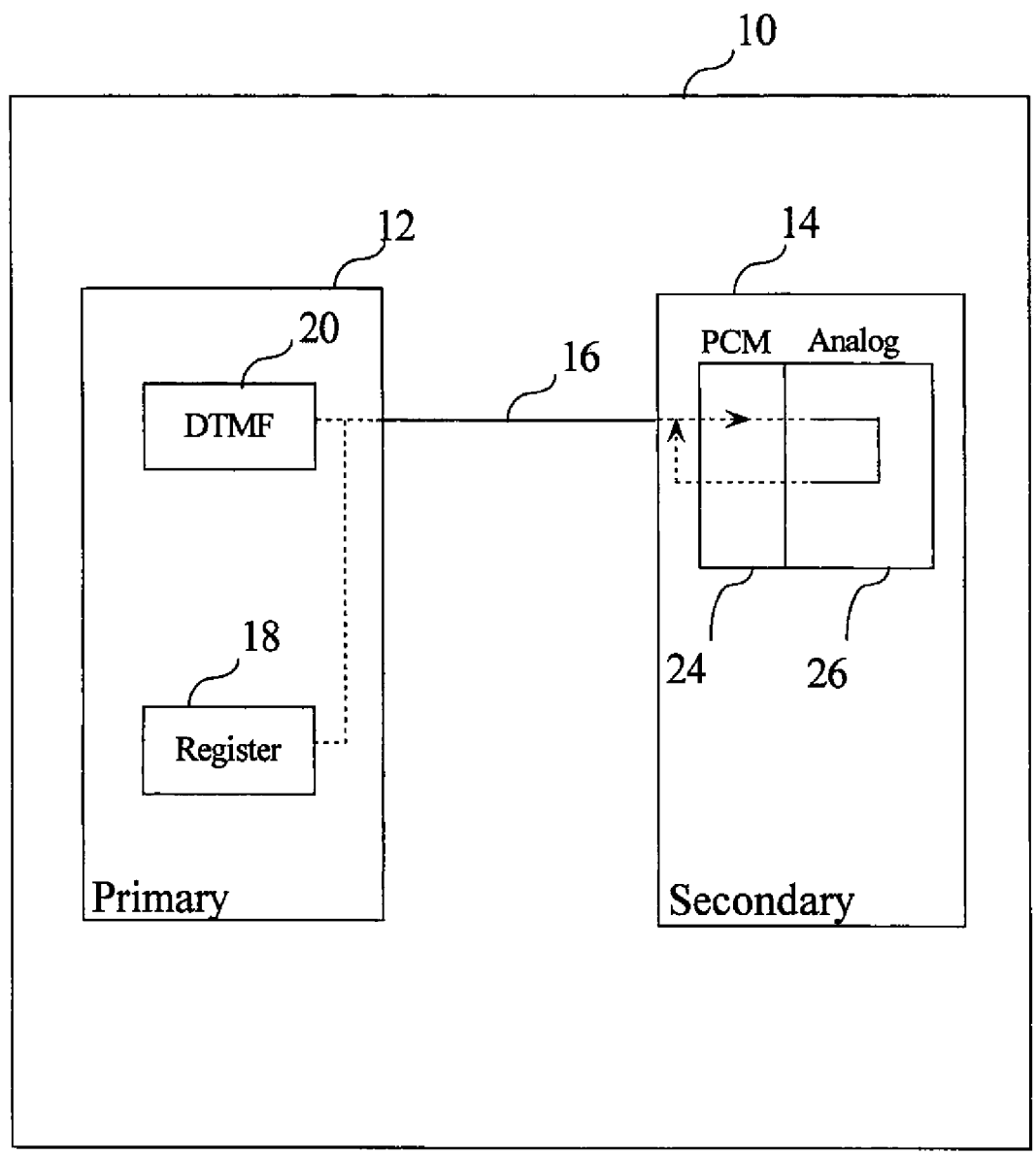
FIG. 3 is a block diagram of an alternative embodiment of the present method with an analog loopback instead of a digital loopback.

Reference is now made to FIG. 3. In an alternative configuration, loopback could occur in analog module 26 and the signal could be merely passed through digital module 24 within secondary baseband circuit 14. In this case, digital interface module 24 would convert the signal to an analog signal and the analog module 26 would merely loop back to the digital module 24 where the signal would again be converted to a digital signal and sent back over interface 16 to primary baseband circuit 12 where the signal would be stored in a register 18. Accordingly, loopback could therefore occur in the analog portion of secondary baseband circuit 14.

The present method therefore verifies the digital interface between the primary and secondary baseband circuits without using any external test equipment. As will be appreciated by those skilled in the art, this generally comprises the voice path for signals.

Figure 4:
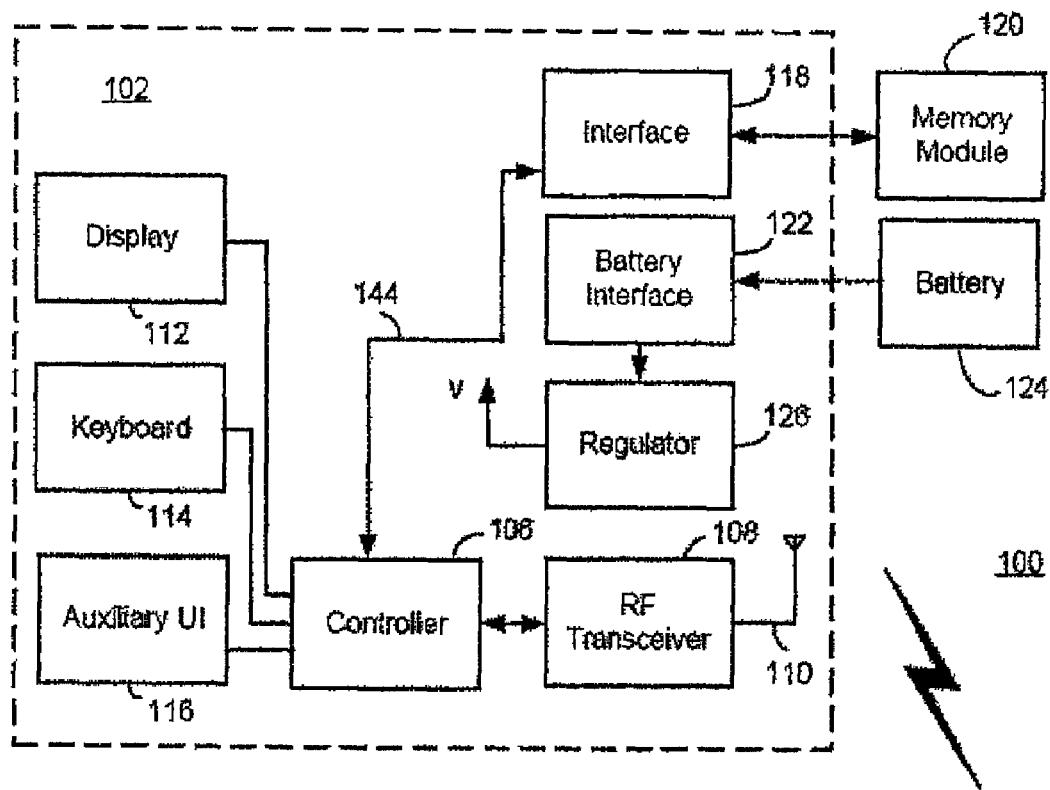
FIG. 4 shows a block diagram of a communications system, including a mobile station upon which the present method can be implemented.
Figure 4:
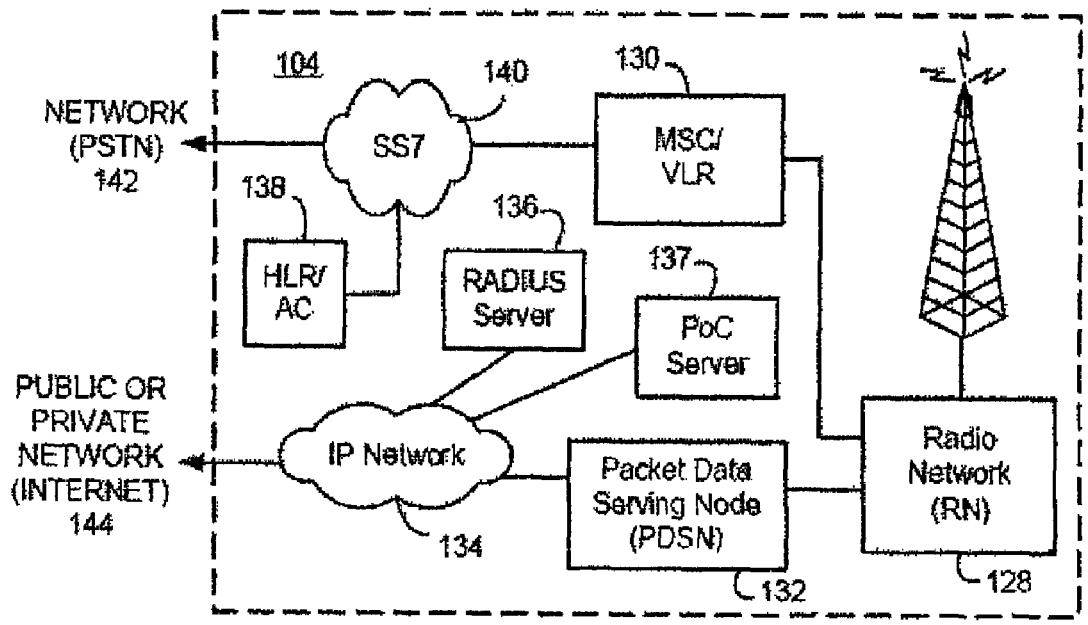

Reference is now made to FIG. 4. FIG. 4 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 4, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 5.

Mobile station 102 communicates in and through wireless communication network 104. In the embodiment of FIG. 4, wireless network 104 is a Third Generation (3G) supported network based on Code Division Multiple Access (CDMA) technologies. In particular, wireless network 104 is a CDMA2000 network which includes fixed network components coupled as shown in FIG. 3. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 4, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 4 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 4. A network will normally be transmitting at very least some sort of paging and system information on an ongoing basis, even if there is no actual packet data exchanged. Although the network consists of many parts, these parts all work together to result in certain behaviours at the wireless link.

Figure 5:
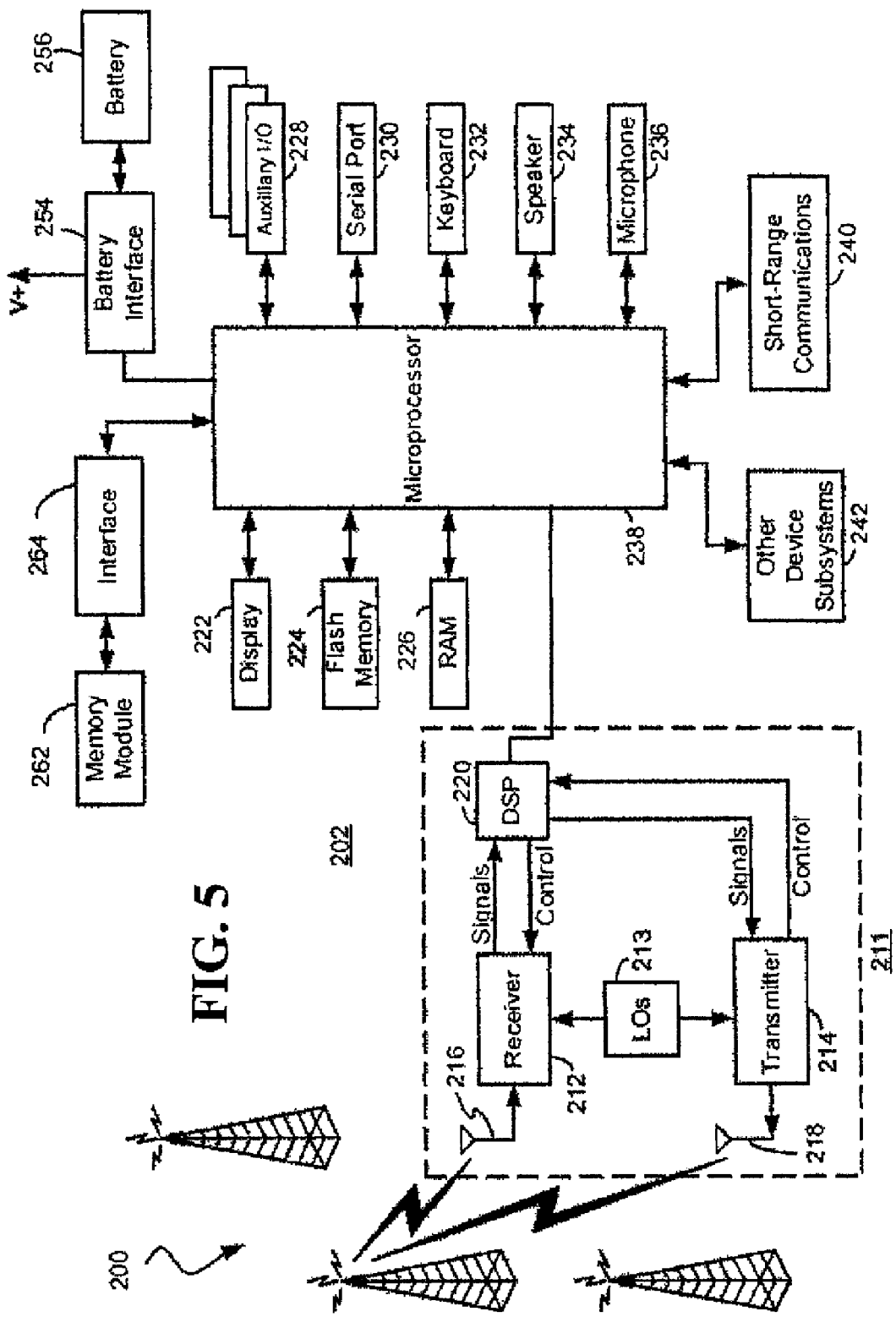
FIG. 5 shows a block diagram of a mobile station upon which the present method can be implemented.

FIG. 5 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 4. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 5, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220 or based on a gain parameter derived from a specific auxiliary device, as described below.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 5) which provides power V+ to all of the circuitry.

Mobile station 202 includes a microprocessor 238 (which is one implementation of controller 106 of FIG. 4) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 4 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 5 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 5 is an additional component which provides for communication between mobile station 202 and different systems or devices, which need not necessarily be similar devices. For example, subsystem 240 may communicate with an acoustic device 280 that may include an infrared device and associated circuits and components, or a Bluetooth™ communication module to provide for communication with similarly-enabled systems and devices. Bluetooth™ is a registered trademark of Bluetooth SIG, Inc.

The above-described embodiments are meant to be illustrative of preferred embodiments and are not intended to limit the scope of the present method. Also, various modifications, which would be readily apparent to one skilled in the art, are intended to be within the scope of the present method. The only limitations to the scope of the present application are set forth in the following claims.

I claim:

1. A mobile device comprising:
 a first audio baseband circuit configured to generate a test signal;
 a second audio baseband circuit configured to be set into a loopback mode; and
 an interface between the first audio baseband circuit and the second audio baseband circuit, said interface configured to:
  carry the test signal sent from the first audio baseband circuit to the second audio baseband circuit while the second audio baseband circuit is in loopback mode; and
  carry a second signal to the first audio baseband circuit, the second signal being the test signal sent to, and looped back from, said second audio baseband circuit wherein the mobile device is configured to internally test the interface and first and second audio baseband circuits by comparing the second signal with an expected result corresponding to the test signal sent, where successful internal voice path verification is predicated based on the comparison.

2. The mobile device of claim 1, further comprising a register for storing the second signal.

3. The mobile device of claim 1, wherein the interface is a code-decode digital interface.

4. The mobile device of claim 3, wherein the code-decode digital interface is a pulse code modulation interface.

5. The mobile device of claim 1, wherein said first audio baseband circuit comprises a digital audio baseband chip of a radio frequency baseband chip.

6. The mobile device of claim 1, wherein said second audio baseband circuit comprises a digital audio baseband chip of a Bluetooth baseband chip.

7. The mobile device of claim 1, wherein the loopback mode of said second audio baseband circuit comprises loopback in a digital interface.

8. The mobile device of claim 1, wherein the loopback mode of said second audio baseband circuit comprises loopback in an analog interface.

9. The mobile device of claim 1 wherein the first audio baseband circuit comprises a dual tone multiple frequency generator module, the test signal being one of a dual tone multiple frequency tone and a single frequency tone.

10. The mobile device of claim 1, wherein said mobile device is configured to check said second signal for an expected signal level and an expected frequency.

* * * * *